United States Patent Office 3,440,235
Patented Apr. 22, 1969

3,440,235
DECOLORIZATION OF COLOR-CODED
PERFLUOROCARBON POLYMERS
Aime Joseph Perreault, South Burlington, Vt., assignor, by mesne assignments, to Haveg Industries, Inc., Wilmington, Del., a corporation of Delaware
No Drawing. Filed Oct. 7, 1964, Ser. No. 402,313
Int. Cl. C08f 1/88
U.S. Cl. 260—92.1                                           8 Claims

ABSTRACT OF THE DISCLOSURE

Perfluorocarbon polymer, e.g., polytetrafluoroethylene, which is color coded has the color removed by the use of nitric acid.

---

This invention relates to the reclaiming of color coded perfluorocarbon polymers.

It is common practice in the art to color code perfluorocarbon polymers used as insulation for electrical conductors, e.g., copper wire, in telephone and other circuits. It is frequently desirable to reclaim such color coded polymers when color coding is no longer required or a different coding is wanted. Previously proposed reclaiming techniques, however, have proved unsuccessful. Thus in some instances they failed to completely remove the color and in other cases damaged underlying insulation.

Accordingly it is an object of the present invention to reclaim color coded perfluorocarbon polymers.

Another object is to completely remove coding on polytetrafluoroethylene and other perfluorocarbon polymers without damaging underlying insulation.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained by subjecting the color coded perfluorocarbon polymer to the action of strong nitric acid, e.g. fuming nitric acid for a period of time sufficient to nitrate the inorganic pigments used in the color coding.

The process of the present invention can be employed for example to remove any of the following coding pigments from polytetrafluoroethylene employed as insulation on wire, e.g. copper or silver wire.

| Pigment | Name | General chemical composition |
|---|---|---|
| Yellow | Cadmium yellow | Cadmium sulfide. |
| Red | Selenium red | Cadmium and selenium sulfide. |
| Green | Chrome green | Chromium and cobalt compounds. |
| Blue | Cobalt blue | Chromium, cobalt and aluminum compounds. |
| Orange | Mercadmium sulfide | Cadmium and mercuric sulphides. |
| Purple | Composite of cobalt blue and selenium red. | Cadmium and selenium sulfides, chromium, cobalt and aluminum compounds. |
| Violet | Mineral violet | Manganese, cobalt and aluminum compounds. |

Nitration of any of these pigments converts them to water soluble salts which can be removed by washing with water.

Perfluorocarbon polymers which can be decolor coded according to the invention include polytetrafluoroethylene (Teflon), polyhexafluoropropylene, copolymers of tetrafluoroethylene with 5 to 95% of hexafluoropropylene (based on the weight ratios of the two starting monomers). Typical copolymers are tetrafluoroethylene-hexafluoropropylene having weight ratios of 80:20 or 75:25 or 30:70 or 34:66 or 19:90 or 1:2 or 4:3 or 23.8:30 or 85:15. Typical perfluorocarbon copolymers are set forth in Bro et al. Patent 2,946,763, Mallouk et al. Patent 2,955,099, Bro et al. Patent 2,988,542, Coffman Patent 3,047,553 and Schreyer Patent 3,085,083.

EXAMPLE 6000 feet of copper wire insulated with Teflon which was color coded yellow with cadmium yellow was placed in a stainless steel tank provided with valves to add nitric acid and water and to drain spent acid and wash water.

95% nitric acid was pumped into the tank at 67° F. to cover the coils of Teflon coated wire. The wire was allowed to dwell in the tank 5 minutes to thoroughly wet the coils and at least partially nitrate the inorganic pigment. The acid was partially drained to a spent acid carboy so that 1 inch of acid was allowed to remain in the tank. The water line valve was opened carefully and a small quantity of water allowed to flow on the acid. This liberated oxides of nitrogen such as $N_2O_3$, $NO$, $N_2O$ and $NO_2$. The temperature of the bath was about 80° F. after this preliminary dilution. The $N_2O_4$ fumes liberated completed the nitration of the inorganic pigment to water soluble salts. This was observed by the disappearance of color.

Water was introduced into the tank to cover the coils. The water was then drained out. The coils were removed from the tank and washed acid free in fresh water using Congo red paper as the indicator. The code free Teflon insulated wire was dried and repooled ready for use either for re-coding or code free insulated wire.

Instead of nitrating a single pigment coded Teflon coated wire as in the above example there can likewise be decoded a mixture of Teflon coated wires having different inorganic pigments. Thus there can be simultaneously decoded Teflon coated wires some of which are coded yellow, others red, others green, others blue, others orange, others purple and the remainder violet, the coding being with the pigments set forth above.

In place of Teflon in the specific example there can likewise be employed color coded polyhexafluoropropylene or any of the tetrafluoroethylene hexafluoropropylene copolymers set forth above which are color coded with inorganic pigments.

What is claimed is:

1. A process of decoloring a perfluorocarbon polymer color coded with an inorganic sulfide pigment comprising treating the coded polymer with concentrated nitric acid to nitrate the inorganic pigment.

2. A process according to claim 1 wherein after the nitric acid has acted on the color coded polymer it is diluted with water and nitration is continued until complete disappearance of the color.

3. A process of decoloring inorganic sulfide pigment color coded perfluorocarbon polymer insulation on wire comprising treating the color coded insulated wire with fuming nitric acid to nitrate the inorganic pigment without damaging the underlying insulation.

4. A process according to claim 3 wherein the nitric acid is diluted with water prior to completion of the nitration and nitration is allowed to continue until the color of the pigment coded insulation has disappeared.

5. A process according to claim 3 wherein the polymer is polytetrafluoroethylene.

6. A process according to claim 3 wherein the polymer is polyhexafluoropropylene.

7. A process according to claim 3 wherein the polymer is tetrafluoroethylene-hexafluoropropylene copolymer.

8. A process of decoloring inorganic pigment selected from the group consisting of cadmium yellow, selenium red, chrome green, cobalt blue, mercadmium sulfide and mineral violet, color coded perfluorocarbon polymer insulation on wire comprising treating the color coded insulated wire with concentrated nitric acid to nitrate said inorganic pigment without damaging the underlying insulation.

References Cited

UNITED STATES PATENTS

| 2,160,931 | 6/1939 | Wiley | 260—80 |
| 2,392,389 | 1/1946 | Joyce | 260—92.1 |

JOSEPH L. SCHOFER, *Primary Examiner.*

J. A. DONAHUE, JR., *Assistant Examiner.*

U.S. Cl. X.R.

260—87.5